(12) United States Patent
Anderson et al.

(10) Patent No.: US 7,816,458 B2
(45) Date of Patent: Oct. 19, 2010

(54) AQUEOUS DISPERSIONS CONTAINING IONOMER RESINS AND RUST-PREVENTIVE IONOMERIC COATINGS MADE THEREFROM

(75) Inventors: Albert Gordon Anderson, Wilmington, DE (US); Walter Mahler, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1100 days.

(21) Appl. No.: 11/284,741

(22) Filed: Nov. 22, 2005

(65) Prior Publication Data
US 2007/0117916 A1 May 24, 2007

(51) Int. Cl.
C08J 3/03 (2006.01)
C09D 5/08 (2006.01)
C09D 123/08 (2006.01)
C08L 23/26 (2006.01)

(52) U.S. Cl. .................. 525/330.8; 525/327.8; 525/919
(58) Field of Classification Search .............. 525/330.8, 525/327.8, 919
See application file for complete search history.

(56) References Cited

U.S. PATENT DOCUMENTS

| 4,051,066 | A | 9/1977 | Miksic et al. |
|---|---|---|---|
| 4,275,835 | A | 6/1981 | Miksic et al. |
| 4,730,016 | A | 3/1988 | Fujii et al. |
| 4,973,448 | A | 11/1990 | Carlson et al. |
| 5,139,700 | A | 8/1992 | Miksic et al. |
| 6,248,701 | B1 * | 6/2001 | Church ........................ 508/158 |
| 6,458,897 | B1 | 10/2002 | Tokita et al. |

FOREIGN PATENT DOCUMENTS

| JP | 2000-198949 A | 7/2000 |
|---|---|---|
| JP | 2003-073856 | 3/2003 |
| JP | 2003073856 A * | 3/2003 |
| JP | 2004-143295 | 5/2004 |
| JP | 2004143295 A * | 5/2004 |
| JP | 2005-075878 | 3/2005 |
| JP | 3793922 B2 | 7/2006 |
| JP | 3801470 B2 | 7/2006 |
| WO | WO 00/50473 | 8/2000 |
| WO | WO 2007/061765 A1 | 5/2007 |

* cited by examiner

Primary Examiner—Kelechi C Egwim

(57) ABSTRACT

The present invention is directed to an aqueous dispersion composition which comprises an ethylene-unsaturated carboxylic acid ionomer resin (A) neutralized with a mixture of ions including at least one divalent metal ion and at least one ammonium ion, (B) a non-water soluble vapor phase corrosion inhibitor, and (C) water. The dispersion exhibits good shelf-life and excellent rust-prevention properties. Durable corrosion resistant ionomeric coatings can be easily formed therefrom, which when applied to metal surfaces and baked, can form a rust-preventive coating layer showing excellent coating adhesion both to the metal surface and to an over coat paint. Such coatings are particularly useful when applied to a vehicle body or part thereof.

7 Claims, No Drawings

AQUEOUS DISPERSIONS CONTAINING IONOMER RESINS AND RUST-PREVENTIVE IONOMERIC COATINGS MADE THEREFROM

TECHNICAL FIELD

This invention relates to aqueous dispersion compositions containing ionomer resins and a process for producing the same, and a rust-preventive coating made therefrom, and treated articles such as vehicle bodies or parts thereof treated with the same.

BACKGROUND OF THE INVENTION

Electrodeposition of rust-preventive primers on metal automotive substrates is widely used in the automotive industry. In this process, a conductive article, such as an autobody or an auto part, is immersed in a bath of an electrodepositable coating composition comprising an aqueous emulsion of a film forming polymer and the article acts as an electrode in the electrodeposition process. A high voltage electric current is then passed between the article and a counter-electrode in electrical contact with the coating composition until a coating of a desired thickness is deposited on the article. In a typical cathodic electrocoating process, the article to be coated is the cathode and the counter-electrode is the anode.

After the electrodeposition process is complete, the resulting coated article is removed from the bath and is rinsed with deionized water and then cured typically in an oven at sufficient temperature to form a crosslinked finish on the article. Once the electrodeposition rust-preventive primer is applied to the automotive substrate, the vehicle is then top coated with a multi-layer automotive exterior finish to provide chip resistance properties and an attractive aesthetic appearance such as gloss and distinctness of image.

One disadvantage associated with conventional electrodeposition processes is that coating defects tend to form on the surface of the coated article, such as pinholes and cracks, which can compromise the corrosion protective properties of the electrodeposited film and produce other deleterious effects such as a rough film surface. The high voltage baths required in electrodeposition coating processes use up large amounts of electricity and are also expensive to maintain. Furthermore, the multiple deionized water rinses are undesirable, as they present significant waste handling and water treatment problems.

Accordingly, there is a desire to eliminate the electrocoating process altogether and find new coating methods and compositions which can replace the electrodeposition process, while still maintaining the desired coating properties for automotive rust-preventive primer finishes such as a high degree of corrosion resistance and paint adhesion to both underlying rust-preventive pretreatments on the metal surface and to paint applied thereover during exterior automotive finishing operations.

Various ionomeric coating compositions comprising aqueous dispersions of ionomer resins made from ion-neutralized ethylene-acrylic acid or ethylene-methacrylic acid copolymers have been proposed for rust-preventive treatment of metal surfaces, for example, as disclosed in JP 2000-198949 A2 to Akimoto et al., WO 00/50473 A1 to Nakata, et al., and U.S. Pat. No. 6,458,897 to Tokita, et al. issued Oct. 1, 2002.

However, diverse properties are required for a coating formed from an ionomer resin dispersion in order for it to be a suitable commercial replacement for an electrocoat bath. When conventional ionomer aqueous dispersions are tried, the resulting coating cannot provide the level of bath stability and uniformity and corrosion resistance, water impermeability, film smoothness and ease of use required to produce a high performance rust-preventive coating of automotive quality.

The present invention provides a uniform aqueous dispersion of an ionomer resin with good stability and rust-preventive properties that sufficiently answers the high performance requirements of automotive finishes and therefore is suitable as a commercial replacement for conventional electrodeposition primers used nowadays in automotive assembly plants. The present invention can also be applied directly over unplated metal to provide direct contact corrosion protection, which provides substantial savings to the automakers, since most vehicle bodies today are constructed of costly Zn plated (galvanized) steel everywhere except for the roof area.

SUMMARY OF THE INVENTION

The stable, uniform aqueous dispersion of the present invention, comprises
(A) an ionomer resin neutralized with a mixture of ammonium ions and at least one divalent metal cation selected from the group consisting of alkaline earth metals and Zn;
(B) a non-water soluble, vapor phase corrosion inhibitor; and
(C) water.

A process for producing the above aqueous dispersion composition, and rust-preventive coatings made therefrom, and treated articles such as vehicle bodies or parts thereof treated with the same, also form part of this invention.

The ionomer resin employed is preferably an ethylene-acrylic acid or methacrylic acid copolymer having an acid content of 5-40 weight percent.

DETAILED DESCRIPTION OF THE INVENTION

In this disclosure, a number of terms and abbreviations are used. The following definitions are provided.

"Ionomer" or "ionomeric resins" are polymers or copolymers of ethylene and acrylic or methacrylic acid that have optionally been partially or completely neutralized with a base, such as a metal hydroxide or oxide or acetate, ammonium hydroxide, or amines. The resulting polymer is capable of forming or behaving as though crosslinks are formed between polymer chains under curing conditions, creating tough flexible films.

"Copolymer" means polymers containing two or more monomers.

"Non-water soluble" means a material that has a water solubility at 25° C. no greater than 2%, preferably no greater than 1%, even more preferably no greater than 0.5%.

An aqueous dispersion composition and a process for producing the same, and a rust-preventive coating made therefrom, and treated articles such as vehicle bodies or parts thereof treated with the same, are explained in detail below.

The aqueous dispersion composition of the present invention comprises a dispersion of at least one film-forming ionomer resin (A), in water. The ionomer resin (A) forming this aqueous dispersion composition is a polymer comprising a polymeric main chain mainly consisting of hydrocarbon, and having carboxyl groups at side chains, wherein at least a part of the carboxyl groups is neutralized with one or more cationic neutralizing agents, such divalent metal cations and/or ammonium ($NH_4^+$) ions. Preferably, the ionomer resin (A) employed in the present invention is an ethylene-unsaturated carboxylic acid copolymer ("ethylene-acid copolymer"), comprising a partially neutralized product obtained by neutralizing at least a part of the carboxyl groups contained in the copolymer with a mixture of ammonium ions and divalent metal cations.

The ethylene-unsaturated carboxylic acid copolymer that constitutes the main skeleton of the ionomer resin may be a random copolymer of ethylene and unsaturated carboxylic acid or a graft copolymer in which unsaturated carboxylic acid is graft bonded to the main chain comprising polyethylene. In particular, the ethylene-unsaturated carboxylic acid random copolymer is preferable. Further, this ethylene-unsaturated carboxylic acid copolymer may contain one kind of unsaturated carboxylic acid only, or two kinds or more of unsaturated carboxylic acids.

The unsaturated carboxylic acid that is the component of the ethylene-unsaturated carboxylic acid copolymer includes an unsaturated carboxylic acid having 3-8 carbon atoms or the like. Specific examples of the unsaturated carboxylic acid having 3-8 carbon atoms include acrylic acid, methacrylic acid, maleic acid, fumaric acid, itaconic acid, crotonic acid, isocrotonic acid, citraconic acid, allylsuccinic acid, mesaconic acid, glutaconic acid, nadic acid, methyinadic acid, tetrahydrophthalic acid, and methylhexahydrophthalic acid. Of those, acrylic acid and methacrylic acid are preferable from the standpoint of film-forming property.

Further, the ethylene-unsaturated carboxylic acid copolymer may contain a third component in the main skeleton such as a softening monomer in addition to ethylene and the unsaturated carboxylic acid. This third component includes unsaturated carboxylic acid esters such as methyl (meth)acrylate, ethyl (meth)acrylate and isobutyl (meth) acrylate, and vinyl esters such as vinyl acetate. If these monomers are included, it is generally desirable for the content to be set in the range of 20 wt % or less, preferably 10 wt % or less, since larger amounts tend to cause the melting point of a coating film to fall and the heat resistance to be unacceptable. Preferably, the ethylene acid copolymer is a dipolymer (no third comonomer).

As for the ethylene-unsaturated carboxylic acid copolymer, when considering the feasibility of manufacture of an aqueous dispersion, the dispersion stability and the physical properties of the coating film obtained with the aqueous dispersion, it is generally desirable for the ethylene-unsaturated carboxylic acid copolymer to have an unsaturated carboxylic acid content of 5-40 wt. %, preferably 10-35 wt %, and more preferably 15-25 wt. %. In the case of using a copolymer containing an unsaturated carboxylic acid in an amount that is less than the above-mentioned range, it is difficult to obtain a composition having good dispersion stability. In the case of using a copolymer containing an unsaturated carboxylic acid in an amount more than the above-mentioned range, a stable dispersion composition can be obtained, however both the waterproofness (imperviousness to water) and mechanical strength of the coated film are reduced.

At least a part of the carboxyl groups that the ethylene-unsaturated carboxylic acid copolymer has on the side chain is neutralized with a base, which in the present invention, generally comprises a mixture of ions, particularly a mixture of divalent metal cations and ammonium ions as the neutralizing agent, to form crosslinks comprising association of carboxylic acid anions with various divalent metal cations and ammonium ions. The divalent metal ions, which remain in the film after the film is baked, provide the desired corrosion resistance to the coating formed therefrom. The ammonium ions evanesce on heating as ammonia and thus provide the desired water impermeability, especially in comparison to alkali metal ions.

As for the divalent metal cations, alkaline earth metals, such as Mg and Ca, and Zn can be used. Of those, the ionomer resins having Zn as the divalent metal cations is preferable in the point that the production is easy. It should be understood that compounds containing the divalent metal cations, when used at the levels desired herein, will typically cause the aqueous dispersion to coagulate. Therefore, for example, when zinc is used, to avoid coagulation, it is desirable to introduce it in the dispersion as an ammonia (or amine) complex preferably in the presence of excess aqueous ammonia (i.e., using an amount of ammonia in excess of the amount that would be needed to neutralize the carboxylic acid groups). Failure to complex the divalent cation prior to contact (i.e., mixing) with the ionomeric resin will generally cause the mixture to coagulate and form an unusable and inferior coating.

Thus, in order to form the desired divalent metal (preferably divalent zinc oxide)/ammonia complex, the divalent metal oxide (e.g., zinc oxide) is preferably milled, such as ball milled, with a large amount of (i.e., excess) aqueous ammonia (10 to 50 moles of ammonia for each mole of zinc oxide) for several hours, preferably at least 5 hours, at room temperature. The resulting slurry can then be added to ionomer resin which may or may not be pre-dispersed with aqueous ammonia. Of course, other techniques may also be used to introduce the divalent metals into the dispersion without coagulation, as will be apparent to those skilled in the art.

Since the metal cations remain in the final film, it is preferred to discuss levels of neutralization in terms of the metal ion. As will be appreciated by one skilled in the art, the preferred degree of neutralization by the metal, i.e., the preferred ratio of metal ion to carboxylic acid anion, of course will depend on the ethylene-acid copolymers and the ions employed and the properties desired. However, the preferred proportion of carboxyl groups neutralized with divalent metal cations to all of carboxyl groups that the ethylene-unsaturated carboxylic acid copolymer has on the side chain, that is, degree of neutralization by the metal, is generally about 20-100%, and preferably 25-50%, so that a coating having excellent corrosion resistance is obtained. Since excess ammonia is preferably used, this typically translates to a mole ratio of metal cation to ammonia in the final mixture of generally about 2 to 100, and preferably 10 to 20.

As will be appreciated by one skilled in the art based on the teachings herein, the preferred level of neutralization will depend on the ethylene-acid copolymers and the ions employed and the properties desired. In particular, where the aqueous dispersion composition of the present invention is used as a rust-preventive treating agent, the above ranges are effective in the point that a rust-preventive layer having excellent corrosion resistance and water resistance can be formed.

The production of ionomer resins used herein can be conducted according to various methods well known in the art, for example, a method of copolymerizing ethylene, unsaturated carboxylic acid, and a third component used according to the need, by a high pressure radical polymerization method, and neutralizing carboxyl groups of the ethylene-unsaturated carboxylic acid copolymer obtained with a compound having the divalent metal cations and ammonium ions; or a method of graft polymerizing unsaturated carboxylic acid onto polyethylene, and neutralizing carboxyl groups of the graft copolymer obtained with a compound having the divalent metal cations and ammonium ions. Further, this production may be conducted by supplying predetermined components into an extruder and melt kneading to conduct reaction, or may be conducted in water or an appropriate organic solvent.

Rather than preparing the ethylene-unsaturated carboxylic acid copolymer, Nucrel®, which is a poly(ethylene-co-methacrylic acid) copolymer, sold by DuPont, Wilmington, Del., can be used as the starting material. This material is typically sold pre-dispersed in ammonia water.

As for the other components, a compound having desired divalent metal cations which can be used to neutralize the resin includes include divalent metal oxides or hydroxides or simple water-soluble salts such as the acetates, sulfates and nitrates of zinc, calcium, or magnesium.

A compound having the desired ammonium ions which can be used to neutralize the resin is ammonia ($NH_3$) or aqueous ammonia (which is also referred to herein as "ammonium hydroxide" or "ammonia water").

In addition to the forgoing materials, in order to obtain a coating film with sufficient water resistance for automotive applications (i.e., impervious to agents which can cause corrosion of metal), the aqueous dispersion also contains a non-water soluble, vapor phase corrosion inhibitor (B).

The vapor phase corrosion inhibitor (B) used in the present invention is vaporizable under ambient conditions to offer corrosion protection to metallic surfaces encased by the coating formed herefrom. As used herein, the term "vaporizable" and its variants refer to a solid or liquid that is capable of turning into a vapor at least at ambient conditions without application of heat. For example, the corrosion inhibitor of the present invention may be a vaporizable solid that is capable of subliming into its vapor, or may be a vaporizable liquid that is capable of evaporating into its vapor at typical ambient conditions of atmospheric pressure and room-temperature (20° C.). Heat may be applied, if desired, to initiate or accelerate vaporization, but is generally not required if the vapor pressure of the inhibitor is sufficiently high.

Virtually any corrosion inhibitor which is compatible with the ethylene-unsaturated carboxylic acid copolymer material and which is releasably contained within the metallic surface to which the copolymer is applied is used, provided that the inhibitor is also non-water-soluble, so that this material will not leach out of the coating film formed from the dispersion when contacted by atmospheric moisture.

The corrosion inhibiting composition of the present invention can inhibit both anodic and cathodic reactions by including certain types of corrosion inhibitors, such as organic and inorganic nitrogen compounds, sulfonates, phosphate compounds and combinations thereof. The corrosion inhibitors of the present invention are desirably substantially anhydrous to minimize the exposure of a corrodible metallic surface to moisture. The corrosion inhibitors desirably have a vapor pressure of about $10^{-2}$ to $10^{-5}$ mm Hg at about 20° C. Such a vapor pressure allows the delivery vehicle to release the inhibitor to effect a proximal metallic surface of a corrodible item.

Desirably the corrosion inhibiting composition of the present invention can also include more than one vapor phase corrosion inhibitor. For example, corrosion inhibitors having different vapor pressures may suitably be selected to provide for a controlled release of the vapor phase inhibitors from the composition over time. In such a manner, a high vapor pressure corrosion inhibitor offers initial corrosion protection to an article due to its high release rate while a low vapor pressure corrosion inhibitor offers sustained corrosion protection due to its lower release rate.

Certain useful corrosion inhibitors of the present invention include dicyclohexylamine, hexadecylpyridinium iodide; dodecylbenzyl quinolinium bromide; propargyl quinolinium bromide; cyclohexylammonium benzoate; dicyclohexylammonium nitrite; benzotriazole; sodium dinonylnaphthalene sulfonate; triethanolamine dinonylnaphthalene sulfonate; ammonium dinonylnaphthalene sulfonate; ethylenediamine dinonyinaphthalene sulfonate; diethylenetriamine dinonylnaphthalene sulfonate and 2-methylpentanediamine dinonylnaphthalene sulfonate; or their salts and combinations thereof.

Additional useful corrosion inhibitors include triazoles, inorganic and organic nitrites, nitrates, phosphates, carbonates, and aliphatic and aromatic amines that are believed to migrate to the surface in the presence of water vapor and provide corrosion protection. These corrosion inhibitors may suitably be used in the present invention. Such compositions are described for instance in U.S. Pat. No. 4,973,448 (Carlson); U.S. Pat. No. 4,051,066 (Miksic); U.S. Pat. No. 4,275,835 (Miksic); and U.S. Pat. No. 5,139,700 (Miksic).

Examples of nitrite compounds that are effective as corrosion inhibitors include sodium nitrite, dicyclohexylammonium nitrite, diisopropylammonium nitrite and nitronaphthaleneammonium nitrite.

A variety of different classes of useful corrosion inhibitors include primary amines; secondary amines; tertiary amines; diamines; aliphatic polyamines; aldehydes; organic acids; salts of aromatic organic acids; salts of quaternary ammonium compounds; nonaromatic heterocyclic amines; heterocyclic amines; thiols (mercaptans); thioethers; sulfoxides; thiourea and substituted thioureas; substituted thiocarbonyl esters; and combinations thereof.

Examples of primary amines useful in the present invention include n-octylamine; n-decylamine; n-tetradecylamine; n-octadecylamine and cyclohexylamine. Examples of secondary amines useful in the present invention include dibutylamine; diamylamine; di-n-octylamine; 3-isopropylamino-1-butyne; 3-benzylamino-1-butyne; and dicyclohexylamine. Examples of tertiary amines useful in the present invention include tributylamine; tri-n-octylamine; and dipiperidinomethane.

Examples of diamines useful in the present invention include n-hexadycyl propylene diamine and n-dodecyl b-methylene diamine.

Examples of aldehydes useful in the present invention include cinnamic aldehyde and furfuraldehyde.

Examples of organic acids useful in the present invention include n-caproic acid; n-caprylic acid; 9,11-octadecadienoic acid and nicotinic acid esters or amides.

Examples of heterocyclic amines useful in the present invention include 6-n-ethyl purine; 1-ethylamino-2-octadecylimidazoline; 1-hydroxyethyl2-octadecylimidazoline; diethylthiophosphate; quinoline; 2,6-dimethylquinoline; acridine; 4,5-diphenylimidazole; benzimidazole; 1-methylbenzimidazole; 1-phenylbenzimidazole and 2-phenylbenzimidazole.

Examples of thiols (mercaptans) useful in the present invention include 2-mercaptobenzothiazole.

Examples of thioethers useful in the present invention include didecylsulfide, ethyl-n-octyl sulfide; diphenylsulfide, phenylbenzyl sulfide; dibenzylsulfide and xylenol polysulfide.

Examples of sulfoxides useful in the present invention include diphenylsulfoxide; di-p-tolylsulfoxide and dibenzylsulfoxide.

Examples of thiourea and substituted thioureas useful in the present invention include phenylthiourea and 1,3-diphenylthiourea.

Examples of phosphates useful in the present invention include dioctylthiophosphate and tributylselenophosphate.

The non-water soluble vapor phase corrosion inhibitor is generally employed in an amount sufficient to provide the desired level of corrosion resistance for a particular application. Therefore, the amount may vary, according to the intended use. Typically, the amount of corrosion inhibitor employed in the dispersion will range from about 0.1-10 wt %, preferably 1-5 wt %, based on the total weight of neutralized resin.

As for the quantity of the water (C) used for manufacture of the aqueous dispersion, when taking ease of production, stability, and economical efficiency into consideration, it is generally desired to adjust the solids concentration in the aqueous dispersion to about 2-60 wt %, preferably about 5-50 wt %, and most preferably 10-40 wt %.

The aqueous dispersion composition of the present invention can be made by various methods well known in the art. Typically, the aqueous dispersion, which can ultimately be used as a rust-preventative coating composition, is made by introducing ionomer resin (A), neutralizing agents, such as ammonia and one or more divalent metal cation complex, and non-water soluble vapor phase corrosion inhibitor (B), and water into a vessel, then stirring them at a temperature above the melting temperature of the ionomer resin, typically about 100-200° C., for a sufficient time to heat melt and uniformly disperse the ionomer resin (A), preferably about 10 minutes to 2 hours.

A suitable aqueous dispersion that can be used by this invention for rust-preventive coating of automotive bodies comprises about 5-50 wt %, preferably 5-30 wt %, and more preferably 10-30 wt % based on the total weight of the dispersion, of film-forming ionomer resin, which is preferably an ethylene-acrylic acid copolymer having an acid content of 18-30 wt. %, 25-50 mole % divalent metal cations and 75-600 mole % ammonia based on the carboxyl groups of copolymer, and a non-water soluble vapor phase corrosion inhibitor in an amount of about 1-5 wt %, preferably about 2-3 wt %, based on the total weight of neutralized copolymer.

A suitable aqueous dispersion for rust-preventive coating preferably also has its average diameter of dispersed particles in the range of about 0.1 µm or less, and preferably 0.05 µm or less and its solid content concentration in the range of 10-45 wt %, and preferably 15-35 wt %, and more preferably 15-30 wt. %.

A suitable aqueous dispersion typically also has a pH of 7 or more and a viscosity of about 30-2,000 mPa·s, and particularly about 50-1,500 mPa·s, at the time of application for good workability.

Various other additives can be blended into the dispersion to provide additional coating attributes, depending on need, within the range that the object of the present invention is not impaired. For example, various other film-forming and/or crosslinking resins such as water-soluble polyester polyols, acrylics, and water-soluble covalent curing agents such as amino resins and the like. The water-soluble amino resin is used in particular to improve strength of the coating, and examples thereof include water-soluble melamine resin, hexamethoxymelamine, methylolated benzoguanamine resins and methylolated urea resins. Examples of the other components include organic and inorganic thickeners to adjust viscosity, surface active agents to improve stability, water-soluble polyvalent or monovalent metal salts and other rust-preventive assistants, mildew proofing agents, fungicides, biocides, ultraviolet absorbers, heat stabilizers, foaming agents, other rheology control agents, pigments, fillers, and extenders.

The aqueous dispersion composition of the present invention is particularly suitable as a rust-preventive treating agent for use in a rust-preventive treatment method in which the composition is applied to a metal surface to form a rust-preventive layer having excellent corrosion resistance and also good adhesion to an over coat paint, such as an automotive primer, filler or pigmented basecoat paint with solid color or flake pigments over which a transparent protective clearcoat is typically applied to form an automotive basecoat/clearcoat finish.

Such coating is applicable to various sorts of metallic materials of various forms. Examples of the metals to which the rust-preventive treatment method is applied include various metals such as zinc-plated steel, zinc-based alloy-plated steel, aluminum-plated steel, aluminum-based alloy-plated steel, cold rolled steel and hot rolled steel. The metal surface to which the coating is applied may contain a slight amount of additional elements, such as surface treatments, such as chromate processing, phosphoric acid processing, etc. The rust-preventive method of the present invention is especially useful over unplated metal, such as zinc, aluminum and aluminum alloys, and the like, which is particularly desirable in the automotive and aircraft industries when the metal is used to construct motor vehicle bodies, such as car and truck bodies.

In the rust-preventive treatment method of the present invention, coating the rust-preventive treating agent can be conducted by any manner of spray, curtain, flow coater, roll coater, brush coating, dipping and the like. In automotive applications, the dipping method is preferably used. In rust-preventive treatment of automobiles and trucks, it is generally desired to keep the vehicle body or part thereof in the dip tank for about 1 to 300 seconds, more preferably about 1 to 60 seconds, at a bath temperature of 18 to 60° C., at atmospheric pressure. After coating the rust-preventive treating agent on the substrate, the agent may be spontaneously dried, but it is preferable to conduct baking. The baking temperature is generally about 60-250° C., and by heating for about 1 second to 30 minutes, it is generally sufficient to drive off the volatile components, so that a rust-preventive layer comprising a coating having good corrosion resistance can be formed.

The thickness of the rust-preventive layer formed on the substrate is appropriately selected according to the purpose of use of rust-preventive treated metal products, rust-preventive treating agent used, kind, thickness or the like of a over coat paint, and the like, and is not particularly limited thereto. Generally, in order to exhibit sufficient rust-preventive ability without causing breakage in the rust-preventive layer when drying after coating the rust-preventive treating agent, it is preferable to coat in a thickness of about 0.3 to 2.5 mils (7 to 60 µm), preferably 0.5 to 1.5 mils (12 to 36 µm).

In the rust-preventive treatment method of the present invention, the over coat paint coated on the rust-preventive layer formed with the treatment by the rust-preventive treating agent preferably is a paint comprising, for example, an acrylic resin, an acryl-modified alkyd resin, an epoxy resin, an urethane resin, a melamine resin, a phthalic acid resin, an amino resin, a polyester resin or a vinyl chloride resin. Of those, a paint comprising an urethane resin, a melamine resin or an acrylic resin is preferable because of particularly excellent adhesion to the rust-preventive layer comprising the rust-preventive treating agent of the present invention.

Further, this over coat paint may contain coloring pigments such as titanium white or carbon black, extenders such as talc, metal pigments such as aluminum powder or copper powder, pearlesecent pigments, such as coated mica, and rust-preventive pigments such as red lead or lead sulfate, and the like. The paint may further contain dispersing agents, drying agents, plasticizers, defoaming agents, thickeners, stabilizers, anti-skinning agents, antimolds, antiseptic agents, antifreezing agents, and the like.

The formation of the coating of the over coat paint is typically conducted by coating the over coat paint on the rust-preventive layer by conventional coating methods, drying, and curing. Typically overcoating methods for automotive applications include spraying, electrostatic spraying, and use of high rotational electrostatic bells, and the like. The drying time and temperature are appropriately adjusted according to the kind of the over coat paint coated, the thickness of the coating, and the like. Generally, a drying time of 5-120 minutes for each layer of overcoat paint is adequate, especially in automotive applications, when the drying temperature is in the range of 50-160° C.

In the rust-preventive treated metal products produced by the rust-preventive treatment method of the present invention, the thickness of coating of the over coat paint is appropriately determined according to the purpose of use of the rust-preventive treated metal products, kind of the over coat paint used, and the like, and is not particularly limited thereto. For example, when coating automotive bodies or parts thereof, after the rust-preventive primer coating layer of the present invention is dried, it is generally desired to overcoat it with a primer surfacer to provide a smooth film free of surface imperfections over which, after baking and sanding, an automotive topcoat finish such as a colored basecoat/clearcoat finish is applied, preferably in a wet-on-wet manner and then cured simultaneously in an oven. The overall thickness of the dried and cured composite multi-layer finish is generally about 40-150 μm (1.5-6 mils) and preferably 60-100 μm (2.5-4 mils).

The rust-preventive treated metal products obtained by the rust-preventive treatment method of the present invention have a rust-preventive layer having excellent water resistance and rust-preventive property, and therefore can suitably be used as parts for automobiles, household appliances, building materials, or the like.

The aqueous dispersion composition has good stability and good shelf life, such that neither the particle size nor the viscosity is significantly change over times of up to a year or more.

Coatings formed therefrom have excellent rust-preventive properties and provide high level of adhesion to treated or untreated metals and are tough, flexible, stone-chip resistant, and are relatively impermeable to moisture and other corrosive agents, and can provide rust preventive coatings having properties desirable for automotive finishes.

The following Examples illustrate the invention. All parts and percentages are on a weight basis unless otherwise indicated.

EXAMPLE 1

Preparation of Aqueous Dispersion

Into a 1000 ml bottle is charged 8.6 g of zinc oxide, 20 g of conc. ammonium hydroxide, 2.0 g of dicyclohexylamine, and ten 0.5 in. long×0.5 in. diam. high density alumina (Burundum®) ceramic grinding stones (manuf. by U.S. Stoneware, East Palestine, Ohio). The bottle was sealed, placed on a roller mill (manuf. by U.S. Stoneware, East Palestine, Ohio), and rolled at 53 rpm for 18 hours. Then 800 g of Michem Prime® 4983R (ethylene/21% acrylic acid (Nucrel®) copolymer at 25% solids in ammonia water manuf. by Michelman, Inc., Cincinnati, Ohio), 10 g of ammonium hydroxide, and 70 g of water was added to the bottle. The contents were placed on the roller mill and rolled for 24 hours. The dispersion was filtered through a Nylon stocking to give an ionomeric dispersion having 23% solids and 38% neutralization of the carboxylic acid groups by zinc.

EXAMPLE 2

Preparation of Rust-Preventive Treated Metal Plate

Cold rolled steel plates, 3 in.×5 in., (32 guage) (manuf. by ACT Laboratories, Inc, Hillsdale Mich.) were cleaned by dipping them in a 1:1 v/v solution prepared from dichloromethane and acetone. After removing the cleaning solvent by air drying, the plates were dipped in the dispersion of Example 1 and then heated in an 95° C. oven for 25 to 30 minutes. The plates were then removed from the oven and allowed to cool to room temperature. The thickness of the coating was found to be approx. 1.0 mils. (approx. 24 μm) using a Permascope® ES thickness meter (manuf. by Twin City Testing Corp., North Tonawanda, N.Y.).

Test Results

Coating Adhesion was determined by cutting the coating with a razor to create a cross-hatched design with cut-lines spaced 2 mm apart. Five lines were cut in each direction to form 16 squares. A piece of Scotch tape was firmly pressed over the cross-hatched design and the pulled off at an angle of 90 degrees. Perfect adhesion results in no loss of coating within the 16 squares and is given a score of 16/16. Loss of all squares is given a score of 0/16. The coating of Example 2 had an adhesion score of 16/16.

Corrosion resistance was determined by placing the coated steel sheets prepared in Example 2 in 3% sodium chloride solution for 10 days and noting the appearance of rust. Prior to the corrosion test, the edges of the coated steel panels were painted with an oil-based alkyd paint. Coatings prepared as in Example 2 that are 0.5 mil or greater in thickness displayed no corrosion.

Various other modifications, alterations, additions or substitutions of the components of the processes and compositions of this invention will be apparent to those skilled in the art without departing from the spirit and scope of this invention. This invention is not limited by the illustrative embodiments set forth herein, but rather is defined by the following claims.

We claim:

1. An aqueous dispersion composition consisting of: (A) an ionomer resin neutralized or partially neutralized with a mixture of bases consisting of a base whose cation is a divalent metal cation and a base whose cation is an ammonium ion ($NH_4^+$), (B) a non-water soluble vapor phase corrosion inhibitor, (C) water, and, optionally, (D) one or more additives selected from the group consisting of: other film-forming and/or crosslinking resins and water-soluble covalent curing agents;
   wherein said other film-forming and/or crosslinking resins are selected from the group consisting of water-soluble polyester polyols and acrylics; wherein said water-soluble covalent curing agents are selected from the group consisting of amino resins; and wherein said amino resins are selected from the group consisting of water-soluble melamine resin, hexamethoxymelamine, methylolated benzoguanamine resins and methylolated urea resins.

2. The aqueous dispersion of claim 1 wherein the ionomer resin is an ethylene-unsaturated carboxylic acid copolymer having an acid content of 5-40 wt%.

3. The aqueous dispersion of claim 1 wherein the ionomer resin is an ethylene-acrylic or methacrylic acid copolymer having an acid content of 10-35 wt%.

4. The aqueous dispersion of claim 1 wherein the divalent metal ion is selected from the group consisting of Zn.

5. The aqueous dispersion of claim 1 wherein the dispersion has a solids content of 10 to 45 wt%.

6. An ionomeric coating composition, comprising the aqueous dispersion of any of claims 1 to 5.

7. The ionomeric coating composition of claim 6, further comprising one or more other additives selected from the group consisting of pigments, fillers, extenders, organic and inorganic thickeners, surface active agents, water-soluble polyvalent or monovalent metal salts, rust-preventive assistants that are not water soluble metal salts, mildew proofing agents, fungicides, biocides, ultraviolet absorbers, heat stabilizers, foaming agents, and rheology control agents.

* * * * *